Feb. 17, 1970   E. KRÜGER   3,495,801
ALUMINOTHERMIC WELDING CASTING MOLD
Filed Dec. 27, 1966

INVENTOR
ERNST KRÜGER

BY *James E. Bryan*
ATTORNEY

3,495,801
ALUMINOTHERMIC WELDING CASTING MOLD
Ernst Krüger, Essen, Germany, assignor to Elektro-Thermit G.m.b.H., Essen, Germany, a corporation of Germany
Filed Dec. 27, 1966, Ser. No. 604,895
Int. Cl. B29c 1/14
U.S. Cl. 249—141                              8 Claims

ABSTRACT OF THE DISCLOSURE

The disclosure relates to a casting mold for welding rail ends to one another comprising a mold body having a top and a bottom and a mold cavity therein for receiving a pair of rail ends, said mold cavity having a shape to fit rail ends and including a rail foot receiving portion adjacent the bottom of the body, said body defining a central riser channel means in communication with said cavity and opening upwardly, said body having inflow channel means therein, said inflow channel means opening into said cavity, said body also defining discharge channel means having the lower end thereof in communication with said rail foot receiving portion and the upper end thereof opening through the top of said body, and closing means at least partially closing said discharge channel means.

---

Figure 1:
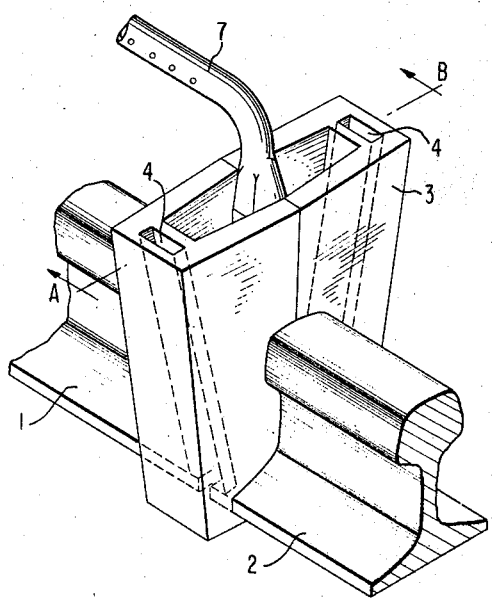

This invention relates to an aluminothermic welding process and a casting mold for use therein. In the process, preheating of workpiece ends which are enclosed within a mold and laid with a gap is effected by using a casting mold containing, in addition to the conventional inflow channels for molten metal, discharge channels for the discharge of preheating flames and combustion gases. After preheating of the workpiece ends to be welded, the discharge channels, which are connected with the casting mold cavity, are closed either completely or partially by means of stoppers or closing members and molten steel is poured into the mold to make the weld.

In the known aluminothermic welding of workpieces, particularly rails, it is known to preheat the welding cross-sections prior to the casting operation by means, for example, of a fuel-air mixture which is laterally blown into the cavity of the casting mold and ignited therein or by means of burners which are mounted above the casting mold and supply an elongated or band-shaped flame.

In the present invention, the casting molds employed for making the welds include, in addition to the channels or ducts serving to admit the fuel mixture or preheating flames, and, also in addition to the channels or ducts for the inflow and rising of the aluminothermically-produced steel, mold channels or ducts through which the combustion gases and preheating flames are discharged to the atmosphere after passing through the mold.

In the welding of rails with preheating of the rail ends from above, it is known to employ casting molds which, after attachment to the rail ends to be welded, constitute, within the area of the intermediate casting gap above the rail head, a preheating and riser channel which extends completely or partially over the width of the rail head and through which the elongated flame emanating from a burner mounted above the casting mold extends into the gap between the rail ends contained in the mold.

For purposes of guiding the aluminothermically-produced steel, these molds also include inflow channels or ducts extending substantially perpendicularly in the mold. These channels terminate into the casting mold cavity generally in the area above the rail foot or base on both sides of the rail web and, if desired, are additionally connected with the casting mold cavity enclosing the web and rail head by means of cut-out portions.

Also positioned in the mold in the area of the rail foot edges are mold channels or ducts terminating into the casting mold cavity; they extend substantially parallel to the inflow channels and project upwardly to the top of the mold. These channels essentially have the purpose of making possible in these areas a perfect transmission of the heat of the flames which, during the preheating operation, extend from above into the riser channel. These channels also permit the discharge of the combustion gases from the mold. The inflow channels, which are designed with respect to the arrangement and cross-section thereof in accordance with the required casting conditions, do not suffice by themselves for the perfect preheating of the outer rail foot zones and the discharge of the combustion gases. On the other hand, the mold channels, being positioned in the casting molds for the purpose of discharging the combustion gases and the preheating flames, have the disadvantage that when the aluminothermically-produced steel is poured into the mold, the molten steel will fill not only the gap between the workpiece, i.e., the rail ends, but also the channels or ducts which are connected with the casting mold cavity and which are provided for the discharge of the combustion gases and the preheating flames. As a result, molten steel will flow through and around the workpiece zones in the areas of these channels in an amount which is, in many instances, much greater than the melting-down welding process would actually require. Consequently, undesirably large melting-down zones are produced in these areas, which may result in increased shrinkage stresses upon subsequent cooling, with the danger that cracks may be formed in the welds. Moreover, the excessive capacity of these channels, which is undesirable from the point of view of welding techniques, results in an increase in the weld metal losses and, in many cases, also in the consumption of a greater portion of weld metal than is required for the welding operation.

In the casting mold of the present invention, stopper or closing members made of steel or iron materials and which have a cross-sectional configuration corresponding to the discharge channel cross-sections have been found to be particularly suitable for carrying out the welding process of the present invention. The end faces of the closing members, which come into contact with the aluminothermically-produced steel, are protected from being welded on, preferably by a coating of a fireproof material such as plastic molding sand or graphite, for example. Furthermore, it is possible to also employ prefabricated closing members made from a fireproof material, such as chamotte or $CO_2$-hardened molding sand, for example. These must be secured, however, against rising up in the channels when molten steel is poured into the mold.

For the purpose of performing series weldings, such as rail weldings for example, the channels in the casting mold serving for preheating may extend upwardly from the casting mold cavity with varying cross-sectional dimensions, in which case, for example in rail welding molds, the channels extending from the rail foot edges have the required cross-section up to a specific height and thereafter will have an enlarged cross-section so that the closing members, being dimensioned to the enlarged cross-sections can be inserted into the channels only to the point of the cross-sectional transitions. The height of the portions or sections of the mold channels having a smaller cross-section, which are upwardly closed by means of the closing members, depends in this case upon the amount of steel to be received in the remaining channel cavities, which steel serves for rinsing and which has been found to be favorable from the point of view of welding techniques for melting down the welding zones. The capacity and filling level of the mold channels, with uniform cross-sectional area and shape, may be controlled and varied by means of closing members consisting, for example, of steel or iron materials equipped with limiting stops or abutments which will rest upon the top of the mold after the insertion of the closing members. In this case, the closing members may have bores into which the limiting stops are inserted, depending upon the desired depth of penetration of the closing members into the discharge channels.

Figure 2:
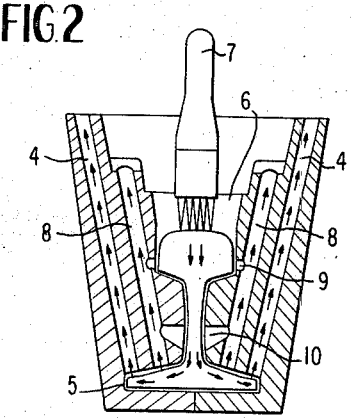
Figure 3:
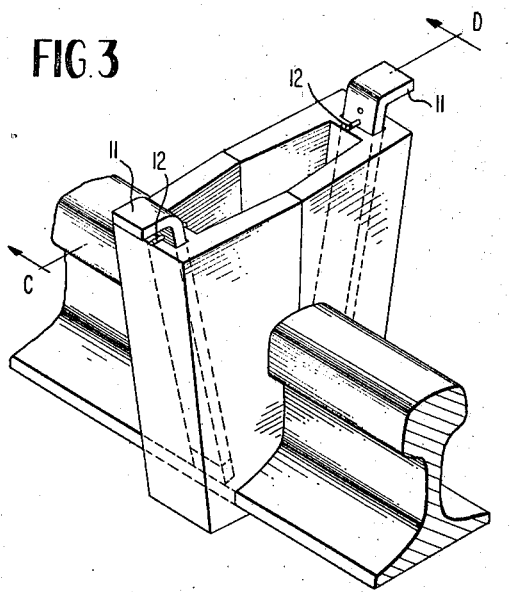
Figure 4:
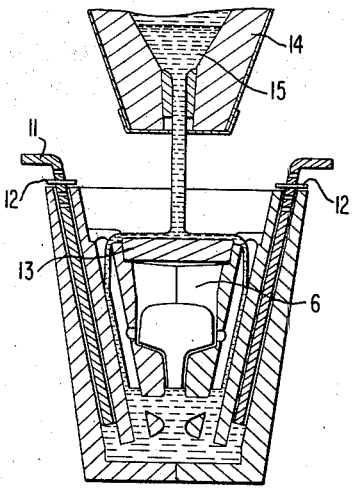

The process and apparatus of the invention will be further illustrated by reference to the accompanying drawings in which:

FIGURE 1 is a perspective view of rail ends to be welded which are enclosed within a mold having a preheating burner positioned in the top thereof, FIGURE 2 is a view in cross-section taken on line A–B of FIGURE 1, FIGURE 3 is a perspective view of the rail ends enclosed within the casting mold and closing members according to the present invention inserted therein, and FIGURE 4 is a cross-sectional view taken along line C–D of FIGURE 3, showing the casting mold enclosing the rail ends, with the closing members inserted, and with a reaction crucible positioned above the casting mold during the pouring of aluminothermically-produced steel into the mold.

Referring to the drawings, the rail ends 1 and 2 to be welded, and which are laid with a gap, are surrounded or enclosed within an upwardly open casting mold 3 which includes the channels 4 extending from the area of the rail foot edges. These channels terminate into the casting mold cavity 5 surrounding the rail ends and project upwardly to the top of the mold. Above the rail head, the casting mold cavity 5 becomes a riser channel 6 in and above which an elongated nozzle burner 7 is mounted for the purpose of preheating the rail ends 1 and 2 to be welded. The mold also includes inflow channels 8 for guiding aluminothermically-produced steel into the mold, these channels terminating into the casting mold cavity above the rail foot by way of cut-out portions 9 and 10.

During the preheating operation, the flames originating from the preheating burner 7 extend through the riser channel 6 into the gap between the mold-enclosed rail ends 1 and 2 at which time the flames, indicated by arrows in FIGURE 2, are deflected in the area of the rail foot and, after giving up their heat, are discharged to the atmosphere through the channels 4 and, to a limited extent, through the inflow channels 8. In this case, the channels 4, being positioned within the area of the rail foot edges, make possible an adequate preheating of these rail foot zones and a simultaneous discharge of the preheating flames and combustion gases.

When the rail ends to be welded have reached the required preheating temperature, the preheating burner 7 is removed and the closing members 11, the end faces of which are coated with a fireproof material, are introduced into the channels 4, as shown in FIGURES 3 and 4, until the limiting stops or abutments 12 rest on the top of the mold. The closing members 11 are fabricated in such a manner that there remains a small gap or allowance between them and the channel walls, in order to allow for ventilation of the casting mold cavity in this area when the aluminothermically-produced steel is poured in.

Then, the riser channel 6 is covered by a fireproof insert 13 and pouring of molten steel 15, which has been aluminothermically produced in the reaction crucible 14, is performed in known manner. The casting jet is discharged, during pouring, over the insert 13 and, from there the steel is supplied by way of the inflow channels 8 and by way of the cut-out portions 10 and 9 to the casting mold cavity 5 surrounding the rail ends. The closing members 11, having been inserted in the channels 4 and determining the filling level of these channels, have the effect that only so much steel flowing around the rail zones in these areas is received in the channels 4, after giving off its heat, as is required for melting down these zones in a favorable manner from the point of view of welding techniques.

After the casting is completed, the closing members 11, which have been prevented from being welded on, are removed from the mold and are thus ready to be used again in subsequent welding operations. The removal of the casting mold and the finishing or further treatment of the welded joint is performed in known manner.

It will be obvious to those skilled in the art that many modifications may be made within the scope of the present invention without departing from the spirit thereof, and the invention includes all such modifications.

What is claimed is:

1. A casting mold for welding rail ends to one another comprising a mold body having a top and a bottom and a mold cavity therein for receiving a pair of rail ends, said mold cavity having a shape to fit rail ends and including a rail foot receiving portion adjacent the bottom of the body, said body defining a central riser channel means in communication with said cavity and opening upwardly, said body having inflow channel means therein, said inflow channel means opening into said cavity, said body also defining discharge channel means having the lower end thereof in communication with said rail foot receiving portion and the upper end thereof opening through the top of said body, and closing means at least partially closing said discharge channel means.

2. A casting mold as defined in claim 1 wherein said discharge channel means is disposed substantially parallel with and laterally outwardly of said inflow channel means.

3. A casting mold as defined in claim 1 wherein said inflow channel means opens downwardly into said rail foot receiving portion and also opens into said cavity through cutout portions of the body.

4. A casting mold as defined in claim 3 wherein the lower end of said discharge channel means is in communication with a part of said rail foot receiving portion laterally outwardly of that part of the foot receiving portion into which said inflow channel means opens.

5. A casting mold as defined in claim 1 wherein said discharge channel means extends substantially perpendicularly upwardly from said rail foot receiving portion.

6. A casting mold as defined in claim 1 wherein said closing means is fabricated from a ferrous metal.

7. A casting mold as defined in claim 1 wherein the closing means is provided with fireproof material at the end thereof.

8. A casting mold as defined in claim 1 wherein the closing means has a cross-sectional configuration corresponding to that of the discharge channel means, and adjustable limit stop means for adjusting the penetration of said closing means into said discharge channel means.

References Cited

UNITED STATES PATENTS

| | | | |
|---|---|---|---|
| 2,977,651 | 4/1961 | Boutet | 164—54 |
| 2,309,288 | 1/1943 | Young | 164—105 X |
| 2,932,863 | 4/1960 | Ahlert | 164—105 X |
| 1,534,022 | 4/1925 | Begtrup. | |
| 2,416,863 | 3/1947 | Begtrup. | |
| 2,469,062 | 5/1949 | Begtrup. | |
| 3,084,925 | 4/1963 | Stauffer et al. | 266—38 X |
| 1,756,054 | 4/1930 | Crum | 164—54 |

FOREIGN PATENTS

| | | |
|---|---|---|
| 1,046,449 | 12/1958 | Germany. |
| 221,233 | 4/1959 | Australia. |
| 1,106,328 | 7/1955 | France. |
| 702,379 | 1/1931 | France. |

J. SPENCER OVERHOLSER, Primary Examiner

V. K. RISING, Assistant Examiner

U.S. Cl. X.R.

164—54, 105, 410; 249—86